United States Patent
De Malsche (10) Patent No.: US 10,794,876 B2
(45) Date of Patent: Oct. 6, 2020

(54) HIGH-PERFORMANCE LIQUID CHROMATOGRAPHY

(71) Applicant: VRIJE UNIVERSITEIT BRUSSEL, Brussels (BE)

(72) Inventor: Wim De Malsche, Berchem (BE)

(73) Assignee: VRIJE UNIVERSITEIT BRUSSEL, Brussels (BE)

(*) Notice: Subject to any disclaimer, the term of this patent is extended or adjusted under 35 U.S.C. 154(b) by 206 days.

(21) Appl. No.: 15/743,460

(22) PCT Filed: Jul. 14, 2016

(86) PCT No.: PCT/EP2016/066829
§ 371 (c)(1),
(2) Date: Jan. 10, 2018

(87) PCT Pub. No.: WO2017/009438
PCT Pub. Date: Jan. 19, 2017

(65) Prior Publication Data
US 2018/0202981 A1 Jul. 19, 2018

(30) Foreign Application Priority Data
Jul. 14, 2015 (EP) .................... 15176561

(51) Int. Cl.
*G01N 30/38* (2006.01)
*G01N 30/32* (2006.01)
(Continued)

(52) U.S. Cl.
CPC ............. *G01N 30/38* (2013.01); *G01N 30/32* (2013.01); *G01N 30/6095* (2013.01);
(Continued)

(58) Field of Classification Search
CPC .... G01N 30/38; G01N 30/32; G01N 30/6095; G01N 2030/027; G01N 2030/326; G01N 2030/387
(Continued)

(56) References Cited

U.S. PATENT DOCUMENTS

| 2,555,487 A | 6/1951 | Haugaard et al. |
| 4,999,098 A | 3/1991 | Pohl et al. |

(Continued)

FOREIGN PATENT DOCUMENTS

| WO | 9726532 A1 | 4/1997 |
| WO | 2009133152 A1 | 11/2009 |
| WO | 2012040555 A1 | 3/2012 |

OTHER PUBLICATIONS

European Search Report from EP Application No. EP 15176561.7, dated Dec. 16, 2015.
(Continued)

*Primary Examiner* — Octavia Hollington
(74) *Attorney, Agent, or Firm* — Workman Nydegger (57) ABSTRACT

A chromatographic column assembly is described, comprising a channel and a flow inducer. The channel comprises an inlet for receiving a sample liquid and an outlet, and is adapted for separating the sample liquid into components when the sample liquid flows through the channel in an axial direction from the inlet to the outlet. The flow inducer is adapted for controllably inducing, when the sample fluid is flowing through the channel, a motion of the sample liquid in the channel in a plane substantially orthogonal to the axial direction.

17 Claims, 3 Drawing Sheets

(51) Int. Cl.
*G01N 30/60* (2006.01)
*G01N 30/02* (2006.01)

(52) U.S. Cl.
CPC .. *G01N 2030/027* (2013.01); *G01N 2030/326* (2013.01); *G01N 2030/387* (2013.01)

(58) Field of Classification Search
USPC ........................................................ 73/61.53
See application file for complete search history.

(56) References Cited

U.S. PATENT DOCUMENTS

| | | | |
|---|---|---|---|
| 5,196,115 A * | 3/1993 | Andelman | ............ B01D 15/08 204/645 |
| 5,954,937 A | 9/1999 | Farmer | |
| 6,368,871 B1 | 4/2002 | Christel et al. | |
| 7,731,412 B2 * | 6/2010 | Sparey-Taylor | .... B01F 11/0241 366/127 |
| 8,979,358 B2 * | 3/2015 | Wiechers | ............... B01D 15/16 366/339 |
| 2007/0084727 A1 | 4/2007 | Cummings | |
| 2009/0255601 A1 | 10/2009 | Baeuerle et al. | |
| 2011/0155565 A1 | 6/2011 | Hsieh et al. | |
| 2016/0250566 A1 * | 9/2016 | Bailey | ................... G01N 30/60 210/198.2 |

OTHER PUBLICATIONS

International Search Report from PCT Application No. PCT/EP2016/066829, dated Sep. 20, 2016.

Wang et al., "Electroosmotic Pumps and Their Applications in Microfluidic Systems," Microfluid Nanofluid, vol. 6, Jan. 9, 2009, pp. 145-162.

Zhoa et al. "Effect of Secondary Flows on Taylor-Aris Dispersion," Analytical Chemistry, vol. 79, No. 20, Oct. 15, 2007, 7 Pages.

* cited by examiner

HIGH-PERFORMANCE LIQUID CHROMATOGRAPHY

FIELD OF THE INVENTION

The invention relates to the field of high-performance liquid chromatography. More specifically it relates to a chromatographic column assembly, a liquid chromatography device and a liquid chromatography method.

BACKGROUND OF THE INVENTION

High-performance liquid chromatography (HPLC) is an analytical chemistry technique for separating, identifying and quantifying chemical components in a mixture using a mass transfer process based on adsorption. Liquid chromatography is advantageously suitable for separating small molecules as well as macro-molecules. In HPLC, a mixture solution is typically pumped under pressure through a column comprising an adsorbent material. Each component in the mixture interacts differently with the adsorbent material, e.g. via hydrophobic, dipole and/or ionic interactions, and thus obtains a specific flow rate. The differences in migration speed allow the components in the mixture to be separated. A detector, e.g. comprising an ultraviolet and/or visual spectrum photodiode array and/or a mass spectrometer, may then provide a signal indicative of the amount of each sample component emerging from the column. The quality of the obtained information can furthermore be improved by adjusting other parameters of the device, such as temperature of the column, e.g. using a column oven, and/or the flow rate, e.g. by controlling a pump feeding the solution to the column.

HPLC has various applications, such as in the medical field, e.g. detecting vitamin levels in blood, the legal field, e.g. detecting drugs in urine samples, in research, and in manufacture of for example pharmaceutical, biological or chemical products. Presently, a need exists, e.g. in the proteomics field, for analytical methods which are capable of separating tens of thousands of components. Therefore, in such fields, the pace of progress may be heavily affected by the development of appropriate analytical tools.

Since HPLC is based on differential interaction of each analyte with support structures such as to impart a unique migration velocity to each analyte, performance can be improved by obtaining a faster transport between these structures. It is for example known in the art to reduce the size of these structures, thus affecting diffusion, to obtain a faster transport. However, such size reduction is inherently limited by the practical limitations of packing and fabricating the sub-micron support structures, the pressure tolerance and the viscous heating.

For example, the reduction of the support structure size in HPLC columns has gradually resulted in better performing columns throughout the last few decades. The performance of an HPLC column may be expressed as a plate height H, which depends on the mobile phase velocity u according to $H=A+B/u+Cu$, in which the constants A, B and C relate respectively to column heterogeneity, axial dispersion and mass transfer limitations. The terms A and B relate to packing non-uniformity and axial diffusion, and have been extensively studied in the field.

The term C in the expression hereinabove, which scales to the $2^{nd}$ power of the support diameter, relates to the effect that analytes residing in different flow lines in the mobile phase, or in a stagnant stationary phase, travel at different velocities through the column, thus globally leading to an axial dispersion. When the support size is reduced, less time is needed for an analyte to diffuse across the flow lines, leading to a narrower velocity distribution and a reduced dispersion.

It is known in the field that the axial pressure gradient can be potentially replaced by an axial voltage gradient, because of the plug-flow profile that is generally assumed for electro-osmotic flow (EOF) mobile phase flow propulsion. However, an approach to induce an EOF as known in the art may be limited in use by the surface chemistry and the pH requirements. For example, in order to form an electrical double layer, permanent charges may be required in the stationary phase. Such charged groups reduce the surface coverage of a retentive and/or protective coating, and therefore may make the channel sensitive to undesired interactions. This can therefore result in a reduced performance and fouling. The mobile phase composition can be selected, in accordance with methods known in the art, such that some silanol groups are deprotonated, thus impeding a versatile usage of mobile phase gradient operation. A further limitation is that the required voltage is often very high, due to a large voltage drop in the axial direction, thus making capillary electro-chromatography operation incompatible with the requirement for long channels, e.g. having a length of more than 50 cm, to unravel very complex samples, e.g. protein digest samples.

SUMMARY OF THE INVENTION

It is an object of embodiments of the present invention to provide a good and efficient system and device for liquid chromatography.

The above objective is accomplished by a method and device according to the present invention.

It is an advantage of embodiments of the present invention that a high separation power can be achieved in liquid chromatography.

It is an advantage of embodiments of the present invention that complex samples, e.g. in life science research, can be efficiently analysed.

It is an advantage of embodiments of the present invention that vortices can be used to suppress dispersion in liquid chromatography.

It is an advantage of embodiments of the present invention that alternating current (AC) electrokinetics can be used to generate such vortices. It is an advantage of embodiments of the present invention that arrays of micro-scale vortices can be produced by electro-osmotic flow. It is an advantage of embodiments of the present invention that alternating current electrokinetics can capacitively induce surface charge on which electrical force is exerted, thus requiring no permanent surface charge.

It is an advantage of embodiments of the present invention that micro-scale vortices can be generated which can act on surfaces that are completely devoid of fixed charges. It is an advantage of embodiments of the present invention that undesired analyte interactions are reduced, or even avoided. It is an advantage of embodiments of the present invention that no direct contact of the liquid to be analysed with electrode surfaces is required.

It is an advantage of embodiments of the present invention that mass transport can be accelerated in the lateral direction, e.g. beyond the rate of diffusion only.

It is an advantage of embodiments of the present invention that pressure flow and electro-osmotic flow can be combined to overcome limitations on dispersion in high performance liquid chromatography.

It is an advantage of embodiments of the present invention that the induction of local mixing via electrokinetic effects can be used to establish a uniform and anisotropic enhancement of mass transfer between support structures in a chromatography column. It is a further advantage of embodiments of the present invention that dispersion arising from pressure-driven flow can be reduced, or even annihilated, by said electrokinetic effects.

The present invention relates to a chromatographic column assembly comprising:
a channel comprising an inlet for receiving a sample liquid and an outlet, the channel being adapted for separating the sample liquid into components when said sample liquid flows through the channel in an axial direction from said inlet to said outlet and
a controllable flow inducer for inducing, when the sample fluid is flowing through the channel, a motion of said sample liquid in the channel in a plane substantially orthogonal to said axial direction. Where in embodiments of the present invention reference is made to a controllable flow inducer, reference is made to a flow inducer that can be controlled such that it can be either activated or be de-activated such that the inducing of the flow can be controlled. It is an advantage of embodiments of the present invention that the inducing of a flow in a plane substantially orthogonal to the axial direction can be performed both at low axial velocities as well as at high axial velocities. It is an advantage of embodiments of the present invention that the inducing of a flow in a plane substantially orthogonal to the axial direction can be done substantially independent of the axial flow velocity. The flow inducer referred to may be referred to as an active flow inducer, since it allows to controllably activate or de-activate inducing of flow in a plane substantially orthogonal to the axial direction.

The flow inducer may be a vortex flow inducer.

Induced vortices may have little or no axial velocity component.

The flow inducer may comprise a plurality of electrodes arranged in or on said channel, the plurality of electrodes being adapted for generating an electric field suitable for inducing said motion.

In embodiments of the present invention, retention is based on a hydrophobic interaction with the walls.

The flow inducer may comprise a plurality of electrodes arranged in or on said channel, the plurality of electrodes being adapted for generating an electric field suitable for inducing a motion by acting on charged and/or polarizable constituents of said sample liquid, independent of the macroscopic flow of the sample liquid.

In this way an additional retention mechanism is created, whereby charged or polarized particles are moved under influence of their electrical behavior. This is independent of the overall flow of the sample.

In some embodiments, therefore a double retention mechanism can occur, whereby a first selectivity is obtained by first bringing particles based on their electrical mobility towards the stationary phase and thereafter inducing a hydrophobic interaction at the wall.

The assembly further comprises an electrical insulator for electrically insulating said plurality of electrodes from the sample liquid, when said sample liquid is contained in the channel, and said electric field may be generated by a capacitive coupling of said plurality of electrodes.

The electrodes may be positioned in a top and bottom wall or parallel thereto.

The flow induced may be a flow in a direction between the top and the bottom of the channel.

An electro-osmotic flow may be induced. Interactions for the separation may occur on the stationary phase underneath a temporarily formed double layer.

The assembly further may comprise a power supply for providing an electric potential difference over said plurality of electrodes.

The power supply may be adapted for generating an alternating electric potential difference over the plurality of electrodes.

The channel may comprise a plurality of adsorbent elements for mass transfer separation of said sample liquid when the sample liquid is flowing through the channel.

The plurality of adsorbent elements may comprise an array of pillar structures.

The assembly further may comprise a pump assembly for generating a pressure gradient in the channel along said axial direction. Such a pump assembly thus typically may be independent of the system causing the mixing movement, but is adapted for generating the overall movement of the sample through the system.

The pump assembly may comprise a pump operationally coupled to said inlet such as to generate a pressure in the sample liquid at the inlet that is higher than a pressure in the sample liquid at the outlet.

The pump assembly may be at least partially contained in said channel.

The pumping assembly may comprise an electro-osmotic pump.

The present invention also relates to a liquid chromatography device comprising a chromatographic column assembly as described above.

The present invention also relates to a liquid chromatography method for separating a sample liquid, the method comprising: generating a flow in an axial direction of the sample liquid through a channel; separating the sample liquid into a plurality of components by mass transfer interactions in the channel; and controllably inducing a flow in the sample liquid, when the sample liquid is flowing through the channel, wherein said inducing of the flow comprises inducing a motion of the sample liquid in the channel in a plane substantially orthogonal to the axial direction. Inducing a flow may comprise controllably inducing a vortex flow.

Inducing said flow may comprise generating an electric field that induces said motion by acting on charged and/or polarizable constituents of the sample liquid.

Generating said electric field may comprise generating said electric field via a capacitive coupling of a plurality of electrodes over the sample fluid, wherein the sample fluid is electrically insulated from the plurality of electrodes.

According to some embodiments of the present invention, retention modulation may be performed. The retention may be modulated (influenced), by applying an electrical field over the stationary phase. This allows to obtain dynamical spatial and temporal retention gradients. Peak compression can be obtained and a higher performance can be obtained. The peak capacity can be maximised for a certain column with a fixed length.

According to some embodiments, the use of solvents may be avoided (e.g. only water may be used).

According to some embodiments of the present invention, the channel may be used as transportation means for transporting to another zone without retention and with a minimal dispersion or dilution (e.g. in a lab on chip, a microreactor or to a detector).

Particular and preferred aspects of the invention are set out in the accompanying independent and dependent claims.

Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention relates to a chromatographic column assembly comprising a channel that comprises an inlet and an outlet. The inlet is adapted for receiving a sample liquid. The channel is furthermore adapted for separating the sample liquid into components, e.g. for generating at least two fractions having different relative compositions, when the sample liquid flows through the channel in an axial direction from the inlet to the outlet. The axial direction may correspond to a mean flow path or central flow path through the channel when a liquid is injected under pressure into the inlet and allowed to flow out of the outlet. The chromatographic column assembly also comprises a controllable flow inducer for controllably inducing a motion of the sample liquid in the channel. With controllably inducing a flow, there is meant that the flow inducer can be either activated to induce the particular flow, or can be de-activated in order not to induce the particular flow. The flow inducer may be a vortex flow inducer for generating a vortex flow. This motion is a motion in a plane substantially orthogonal to the axial direction, e.g. while in operation the sample fluid is flowing through the channel. Thus, the motion may refer to a non-axial motion, e.g. the motion may comprise, or consist of, a motion in a direction substantially orthogonal to the axial direction. Substantially orthogonal may refer to an angle of at least 45° with respect to the axial direction, but preferably an angle of at least 60°, or even at least 75°, such as 80°, or at least 85°. For example, substantially orthogonal may refer to a direction of motion at an angle with respect to the axial direction in the range of 85° to 95°, such as in the range of 87° to 93°, e.g. orthogonal to the axial direction.

Figure 2:
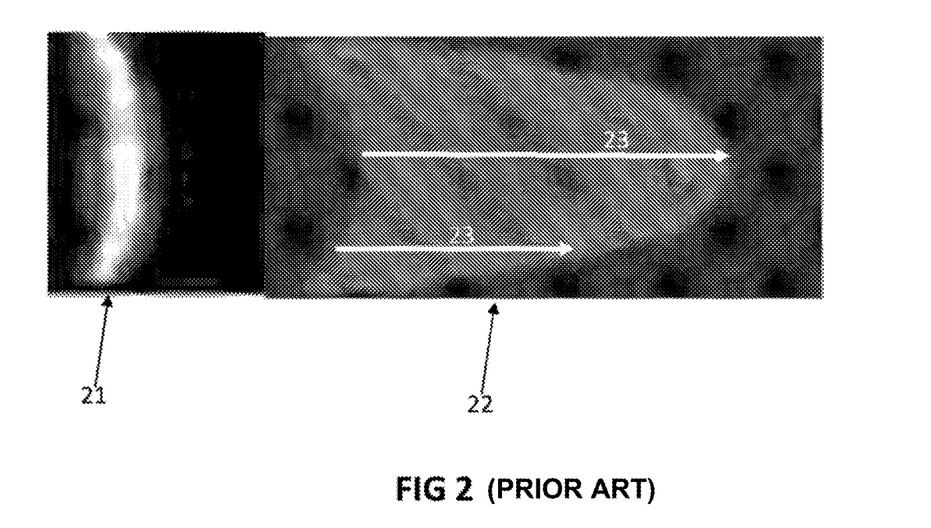
FIG. 2 illustrates a sample band broadening as can be observed in chromatography according to a prior art method.

The flow inducer may be adapted for mixing the sample fluid in a lateral direction, e.g. a non-axial direction, e.g. a direction substantially orthogonal to the axial direction. This mixing advantageously can reduce axial dispersion. It is an advantage of embodiments of the present invention that dispersion in a chromatographic column can be efficiently reduced. An important source of dispersion in chromatography can be due to a parabolic flow profile between support structures, e.g. between channel walls or pillar structures. Such parabolic flow profile may result in analytes having different velocities at different positions between the structures, thus suffering from band broadening. In a device as known in the art, when a sample band moves through a chromatographic support structure, it becomes wider. This can limit the separation efficiency. An important cause for this broadening is the slow mass transfer between different velocity lines of the parabolic flow profile that is present between the support structures, as illustrated in FIG. 2, and at the area of the channel walls. FIG. 2 shows this band broadening due to the parabolic flow profile on a CCD camera image of a dye, immediately after injection 21, and a few seconds later 22. The flow velocity lines 23 indicate the parabolic flow profile. In a device as known in the art, a slow diffusive transport occurs between the flow lines 23, such that the band shape follows the flow profile and broadens.

However, this dispersive effect can be reduced by enhancing the mass transport between the flow lines, in accordance with embodiments of the present invention. For example, a local flow that is substantially perpendicular to the global flow direction from the inlet to the outlet of the channel can be achieved in accordance with embodiments of the present invention.

Figure 1:
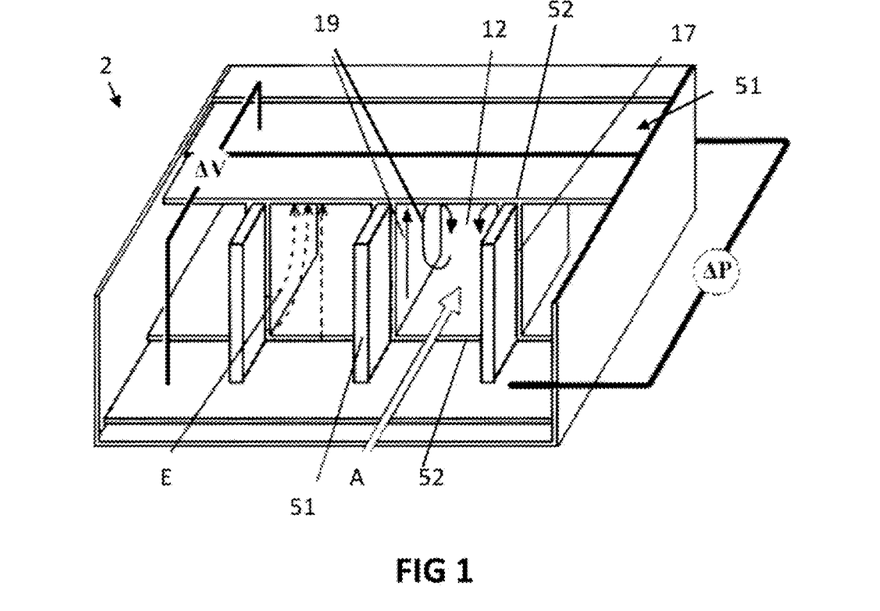
FIG. 1 shows a first exemplary chromatographic column assembly according to embodiments of the present invention.

FIG. 1 shows a chromatographic column assembly 2 according to embodiments of the present invention. The chromatographic column assembly comprises a channel 12, e.g. at least one channel, e.g. a plurality of channels. The channel comprises an inlet for receiving a sample liquid and an outlet. For example, the channel may be a microfluidic channel. For example, the channel may have a cross-sectional area, e.g. a cross-section in a plane orthogonal to the axial direction, of less than 100,000 $\mu m^2$, e.g. of less than 50,000 $\mu m^2$, e.g. in the range of 100 $\mu m^2$ to 20,000 $\mu m^2$, e.g. in the range of 1,000 $\mu m^2$ to 15,000 $\mu m^2$, such as about 12,500 $\mu m^2$. It is to be noted that such small channels may require a flow inducer 5 specifically adapted for use in such micro-scale system.

The channel 12 is adapted for separating the sample liquid into components when the sample liquid flows through the channel in an axial direction A from the inlet to the outlet. For example, the channel 12 may comprise a stationary phase 17, such that molecules in the sample liquid can be discriminated based on their affinity for the stationary phase. For example, the stationary phase can be integrated in at least one channel wall and/or may comprise particles and/or support pillars in the channel. For example, the channel 12 may comprise a plurality of adsorbent elements for inducing a mass transfer separation of the sample liquid when the sample liquid is flowing through the channel. Such a plurality of adsorbent elements may for example comprise an array of pillar structures.

The walls of the channel 12 may be non-porous or porous. The array of pillar structures, e.g. provided inside the channel 12, may comprise porous or non-porous pillar structures. It is an advantage of porous structures that a good specific surface for analyte-stationary phase interactions can be formed by such structures. Porous layers may be integrated into the channel walls and/or into pillar structures by, for example, anodization and/or sol-gel deposition.

The chromatographic column assembly 2 according to embodiments of the present invention comprises a flow inducer 5 for inducing a motion 19 of the sample liquid in a plane substantially orthogonal to the axial direction A.

The flow inducer 5 may for example comprise at least one piezoceramic element for inducing the sample liquid movement. The flow inducer 5 may comprise magnets for inducing movement of magnetizable analytes or carrier. However, preferably, the flow inducer 5 may comprise electric field generating means for inducing the motion 19 of the sample liquid.

The motion 19 may for example be a motion due to an electro-osmotic flow (EOF). For example, the vortex flow inducer 5 may be adapted for generating an electric field E, such that a tangential component of the electrical field lines at the support structures give rise to an EOF, in a direction substantially orthogonal to the axial direction, e.g. driven by capacity induced charges. It is an advantage of an electro-osmotic flow generating flow inducer that the motion 19 may be generated efficiently over a small distance, e.g. in a channel having a cross-section, e.g. in a direction orthogonal to the axial direction, of less than 20,000 $\mu m^2$.

The flow inducer 5 may be adapted for inducing a movement of at least one component in the sample liquid, when in the channel, in a non-axial direction. The non-axial direction may refer to a direction substantially different from the axial direction A, e.g. a direction forming an angle of at least 30° with the axial direction, e.g. a direction at an angle of at least 45° or at least 60° with respect to the axial direction A. Preferably, the non-axial direction is substantially orthogonal to the axial direction, e.g. at an angle in the range of 80° to 100°, e.g. in the range of 85° to 95°. This flow inducer 5 may for example be adapted for inducing a non-axial force on analytes in the liquid when in the channel, or for inducing a non-axial movement of a carrier liquid in the sample liquid when in the channel. Thus, this non-axial force may have a mixing effect with respect to different velocities of analytes at substantially the same axial position. Thus, a smaller distribution in velocities in an axial cross-section of the channel, and therefore a lower dispersion, can be achieved in accordance with embodiments of the present invention.

The flow inducer 5 may be adapted for inducing a continuous and/or oscillating non-axial movement of the sample liquid, e.g. of the carrier liquid and/or of analytes in the sample liquid. The flow inducer 5 may be adapted for inducing a lateral electroosmotic flow between support structures in the channel.

The flow inducer 5 may comprise a plurality of electrodes 51 arranged in or on the channel 12. This plurality of electrodes may be adapted for generating an electric field E suitable for inducing the motion 19 by acting on charged and/or polarizable constituents of the sample liquid.

For example, in embodiments according to the present invention, the channel may comprise electrically conductive support structures, forming at least one of said plurality of electrodes 51, (possibly) covered by an insulator 52. It is to be noticed that not all walls need to be covered by an insulator. These support structures, e.g. pillars, may be provided on, e.g. attached to, the interior surface of the channel and may comprise a highly doped silicon structure as electrode, covered with a silicon dioxide insulator layer and a stationary phase. For example, the conductive support structures may comprise pillars, e.g. doped silicon pillars, having a thickness in the range of 2 μm to 20 μm, e.g. in the range of 4 μm to 10 μm, e.g. having a thickness of about 5 μm. The electrically conductive support structures may also for example comprise a transparent conductive material, such as indium tin oxide ITO. This advantageously allows optical evaluation, e.g. enabling microscope evaluation.

Figure 4:
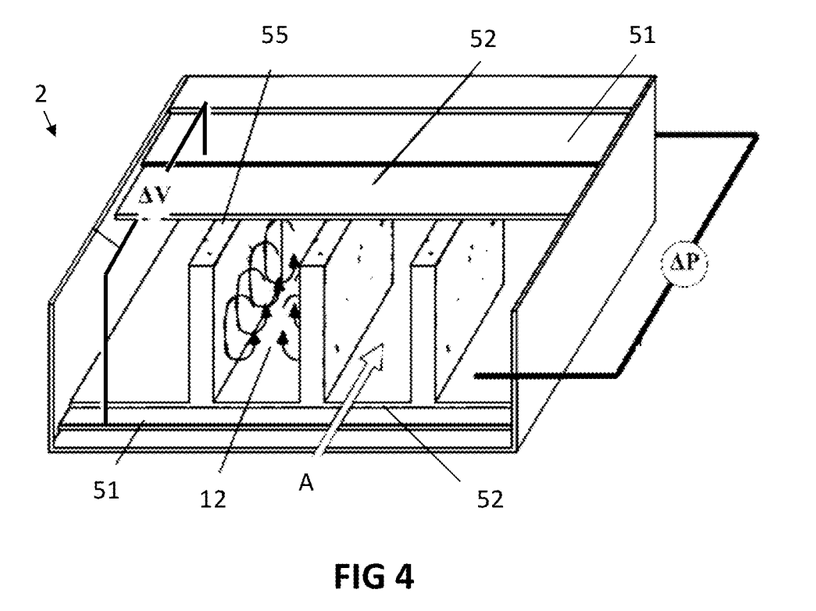
FIG. 4 shows a second exemplary chromatographic column assembly according to embodiments of the present invention.

However, the electrodes 51 are not necessary integrated in the support pillars. For example, FIG. 4 shows a device in accordance with embodiments of the present invention in which the electrodes 51 comprise, e.g. consist of, a bottom electrode and a top electrode, e.g. arranged on two opposite walls of a channel 12 having a rectangular cross-section. These walls may for example be a top wall and a bottom wall of the channel. Both electrodes are insulated from the sample fluid by an insulating layer 52, e.g. forming at least part of the interior wall of the channel 12. Pillar structures 55 may be arranged in the channel 12, e.g. to effect a mass transfer based separation of the fluid. These pillar structures may for example comprise porous shell pillars. The pillar structures may be arranged substantially perpendicular to the electrodes 51.

Figure 5:
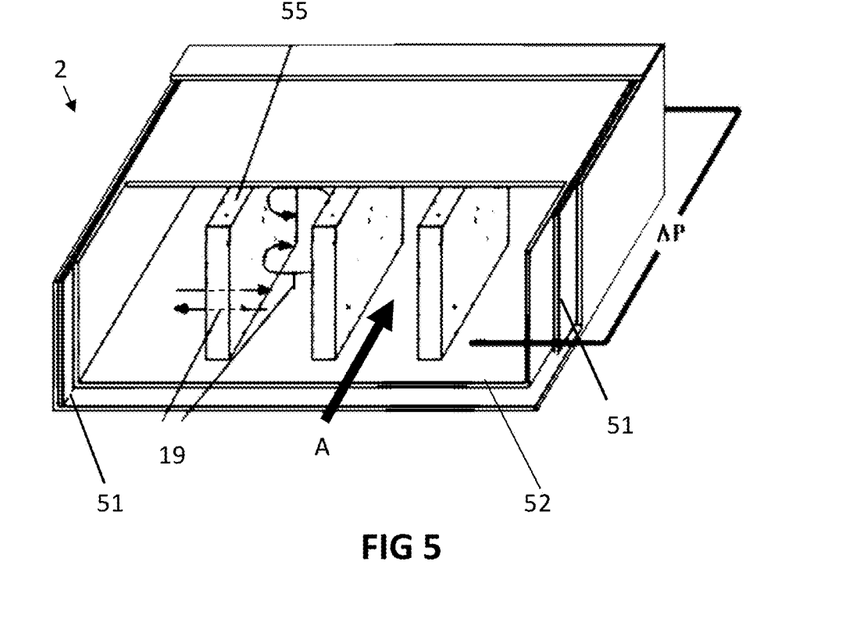
FIG. 5 shows a third exemplary chromatographic column assembly according to embodiments of the present invention.

Furthermore, the direction in which the electric field is applied is not necessarily in alignment with the direction in which the pillar structures 55 are arranged. For example, FIG. 5 shows a device in accordance with embodiments of the present invention in which electrodes 51 comprise, e.g. consist of, a first and a second side-wall electrode, e.g. arranged on two opposite walls of a channel having a rectangular cross-section. Both electrodes are insulated from the sample fluid by an insulating layer 52. Pillar structures 55 may be arranged in the channel 12, e.g. to effect a mass transfer based separation of the fluid. These pillar structures may for example comprise porous pillars. The pillar structures 55 may be arranged substantially parallel to the electrodes 51.

In a device according to embodiments of the present invention, the channel may comprise a plurality of microstructures, such as pillar structures, e.g. porous and/or adsorbing pillar structures, for example arranged in an array. The vortex flow inducer 5 may be arranged in or on at least one pillar of the plurality of microstructures. For example, the vortex flow inducer 5 may comprise a plurality of electrodes for generating an electric field E. The electrodes and the microstructures may be arranged such that lateral vortices in the liquid flow through the channel are created by electro-osmosis. Thus, in embodiments of the present invention, local mass transfer can be advantageously improved in an anisotropic fashion. Particularly, an ordered array of fluid flow vortices may be generated by electro-osmosis.

The tangential component of the electrical field E at the support structures may give rise to a vertical (e.g. vertical as drawn in FIG. 1) electro-osmotic flow, for example driven by capacity induced charges. As the EOF pumping only occurs at the vertical surfaces, a returning flow is created, to satisfy mass conservation, completing the motion path 19, e.g. thus creating a local flow, e.g. a local vortex flow. Even though also an axial component could be induced in the vortex, this component can be reduced or even avoided by appropriately selecting a suitable pillar shape for the support structures. Thus, the shape of the support structure, e.g. the shape of the pillars, may be adapted for reducing or avoiding an axial component of the flow, e.g. vortex flow.

The chromatographic column assembly 2 may comprise an electrical insulator 52 for electrically insulating the plurality of electrodes 51 from the sample liquid, when the sample liquid is contained in the channel 12. Thus, direct electrical contact may be avoided with the mobile phase. It is an advantage of embodiments of the present invention that electrochemical degradation can be reduced or even avoided.

For example the electrodes 51, such as the conductive support structures referred to hereinabove, may be covered by an insulating layer of silicon dioxide, e.g. having a thickness in the range of 10 nm to 100 nm, e.g. in the range of 20 nm to 50 nm, for example a thickness of 30 nm. The insulating layer may be a conformal layer of $SiO_2$. The insulating layer may also comprise, or consist of, a layer of $Si_3N_4$.

For example, the conformal nature of thermally deposited $SiO_2$ may reduce the risk for electrochemical decomposition of the underlying electrode material, e.g. doped silicon or ITO, at least when operated below the breakthrough field strength, since there will be no physical contact with the mobile phase.

Furthermore, the electric field E may be generated by a capacitive coupling of the plurality of electrodes. It is an advantage of embodiments of the present invention that no permanent charges may be left on the stationary phase.

The lateral flow motion 19 may thus be generated by an oscillating electroosmotic flow (EOF), which is induced capacitively. The plurality of electrodes 51 may comprise at least a first electrode and at least a second electrode, for connecting to two corresponding power supply terminals of a power supply. The first and second electrode may be arranged such that a small gap exists between the first electrode and the second electrode. For example, the closest distance between any point on the first electrode and any point on the second electrode may be less than or equal to 500 μm, for example in the range of 1 μm to 200 μm, e.g. in the range of 5 μm to 100 μm, such as in the range of 10 μm to 50 μm, e.g. in the range of 1 μm to 25 μm. Due to such small gap distance, no permanent charges may be required, which may be considered a bottleneck of classical capillary electrochromatography (CEC). For example, in CEC, an axial voltage gradient is imposed over a length of a few cm to tens of cm, e.g. over a length in the range of 1 cm to 100 cm.

For example, as shown in FIG. 1, the channel may comprise support structures that also function as electrodes. These support structures may be isolated from a counter-electrode plate, e.g. a top electrode plate over an insulator layer 52 may form a top wall of the channel. Advantageously, very high electrical fields can be induced before reaching the breakthrough voltage when the support structures, which also act as electrodes, have a small height. For example, the electro-osmotic pumping power can be advantageously high for small electrode/pillar heights, e.g. pillar heights in the range of 10 μm to 40 μm, e.g. in the range of 15 μm to 30 μm, for example 20 μm. An alternating current (AC) electro-osmotic flow may achieve a high flow velocity at an AC frequency where counterions are present near the electrodes as well as an electrical field exists in the solution between the opposing electrodes. For example, the AC frequency may be selected to be about equal to, e.g. equal to, the electrode/solution RC-time.

The AC potential driving the electrodes may have a substantially sinusoidal profile, a substantially periodic rectangular block-wave profile, or a substantially triangular profile, e.g. a saw-tooth profile. However, embodiments of the present invention are not limited thereto, and the AC potential may have another periodic, non-constant profile with respect to time. In some embodiments the AC potential may have another non-periodic, non-constant profile with respect to time.

If a sinusoidal potential is applied, the solution may flow with double frequency. Furthermore, the direction of the flow may be the same during the positive and the negative part of the sinusoidal voltage profile, because, as the electrical field direction changes, also the sign of the mobile ions changes.

The effect of an anisotropic increase in mass transfer rate can be illustrated by following numerical example. When a molecule with a molecular diffusion coefficient $D_{mol}$ of $10^{-10}$ m²/s (e.g. over a distance of 20 μm) is in continuous lateral motion in the channel, e.g. in a vortex flow, with a lateral velocity of u=100 μm/s, the transport may occur about 10 times faster than would be the case for pure diffusion only. However, even higher velocities can be attained by electro-osmotic force, e.g. in the range of 1 to 4 mm/s, e.g. in the range of 1 to 3 mm/s, such as 2 mm/s, and many bio-molecules have even lower $D_{mol}$ values. Therefore, large improvements in efficiency may be possible in accordance with embodiments of the present invention, for example about 1, 2 or even 3 orders of magnitude.

The breakthrough voltage may be described by $V_{max}=\varepsilon E_{br}/C_{dl}$, where $\varepsilon$ is the insulator dielectric constant (e.g. 8 $\varepsilon_0$ for silicon nitride), $E_{br}$ is the insulator breakthrough field (e.g. 600 MV/m for silicon nitride) and $C_{dl}$ the electrical dual layer (EDL) capacitance (e.g. about 0.4 F/m for $SiO_2$). The EDL capacity may be charged via the series insulator capacitance, e.g. to a voltage of about +/−0.1V. The system RC time for a solution conductivity of 0.04 S/m, e.g. a 5 mM KCl solution, may be estimated as about 100 μs. Thus an alternating voltage frequency of about 10 kHz may be selected. Thus, in this example, the generated electrical field may be about $10^4$ V/m. This may for example generate an AC EOF of about u=100 μm/s.

The penetration depth of the generated transient flow process may be quantified by the Stokes penetration depth, equal to $\sqrt{2\eta/\rho\omega}$ where $\eta$, $\rho$ respectively represent the solution viscosity and density, and $\omega$ is the applied frequency. For an applied frequency of 10 kHz the penetration depth could be, for example, about 14 μm.

The chromatographic column assembly 2 may also comprise a power supply for providing an electric potential difference ΔV over the plurality of electrodes 51. This power supply may be adapted for generating an alternating electric potential difference, e.g. for generating an alternating current (AC) driving the electric potential difference, over the plurality of electrodes 51.

Voltage modulation in a device in accordance with embodiments of the present invention may also influence retention. For example, a C8-C18 layer, which typically may be covalently attached to the support structures, may be influenced by the imposed electrical field. Therefore, it is another advantage of embodiments of the present invention that retention may be tuned by adjusting electronic parameters of the system, e.g. by selecting a peak voltage difference, an AC frequency, and/or a waveform generated by the power supply. Thus, both temporal and spatial modulation of retention may be modulated by varying electronic parameters. This allows for a mimicking of the mobile phase gradient elution, without changing the mobile phase. Furthermore, very steep gradients may be applied, such that peak compression effects can be achieved, which have the potential of improving performance even more.

For example, the chromatographic column assembly 2 may comprise a plurality of channels, e.g. connected in series, or the channel may be physically or functionally divided into a plurality of regions, e.g. short regions, distributed along the axial direction. Each such channel of the plurality of channels, or each such region of the channel, may be operated using different frequencies, phases and/or voltage amplitudes. Thus, a dynamic retention modulation may be achieved, for example to reduce the amount of useless space between analyte bands.

The chromatographic column assembly 2 may also comprise a cooling element, e.g. a Peltier cooling element, for compensating for the heat supplied by operating the electrodes, e.g. by supplying an alternating current (AC) power supply to the electrodes 51. For example, the cooling element may have a cooling power in the range of 0.1 W to 100 W, e.g. in a range of 1 W to 50 W, for example 10 W, 20 W, 30 W or 40 W. For example, when 1 V is applied over a 25 μm channel height, e.g. the exemplary channel being 500 μm wide by 5 cm long by 25 μm high, and the channel is filled with a typical HPLC buffer, 10 mW to 100 mW may be produced. Note that the flow lateral mixing in a device in accordance with embodiments of the present invention may advantageously also reduce or prevent, e.g. may suppress, temperature gradients.

Figure 3:
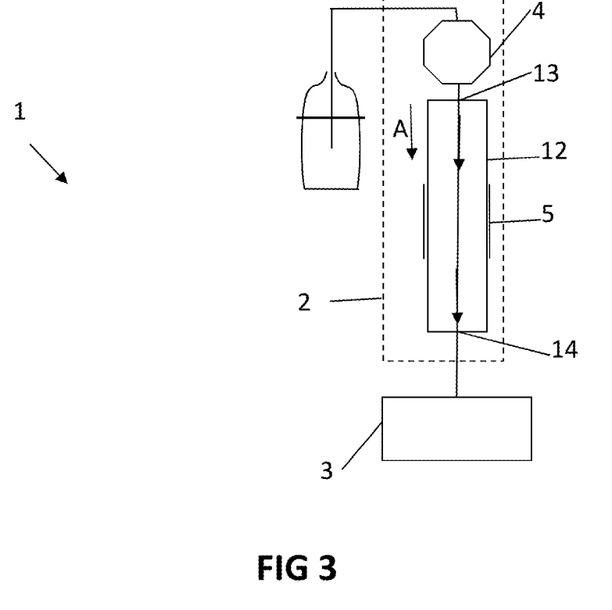
FIG. 3 shows a liquid chromatography device in accordance with embodiments of the present invention.

The chromatographic column assembly 2 according to embodiments of the present invention may also comprise a pump assembly 4 for generating a pressure gradient ΔP in the channel along the axial direction. The pump assembly may comprise a conventional pump, e.g. a membrane pump. The pump assembly may also comprise an electro-osmotic pump. The pump assembly 4 may be at least partially contained in the channel.

The pump assembly 4 may comprise a pump operationally coupled to the inlet 13 such as to generate a pressure in the sample liquid at the inlet 13 that is higher than a pressure in the sample liquid at the outlet 14.

A buried electrode configuration as presented above may also advantageously be used to prevent or reduce fouling. For example, periodic surface property changes that are induced by operating a device in accordance with embodiments of the present invention may remove attached material from a wall in the channel, e.g. particularly when a non-zero flow velocity is generated at the wall. Therefore, the approach presented hereinabove may advantageously provide a robust flow-through system.

In a second aspect, the present invention also relates to a liquid chromatography device 1 comprising a chromatographic column assembly 2 according to embodiments of the first aspect of the present invention. FIG. 3 schematically illustrates an exemplary liquid chromatography device 1 in accordance with embodiments of the present invention. The liquid chromatography device 1 may be a high-performance liquid chromatography (HPLC) device, e.g. a high-pressure liquid chromatography device.

The liquid chromatography device may comprise a separation column comprising at least one channel 12. The separation column may for example comprise a capillary column, e.g. the channel may comprise an open tubular channel. The separation column 2 may comprise a packed capillary column.

The channel 12 comprises an inlet 13 for receiving a sample liquid. The channel may comprise a plurality of adsorbent elements for inducing a separation of the sample liquid into a plurality of liquid components. The channel 12 comprises an outlet 14 for providing the liquid components to an analysis device 3. For example, the channel may comprise a plurality of pillar structures, e.g. porous and/or adsorbing pillar structures, for example arranged in an array. The channel may comprise adsorbing particles. The channel may comprise a monolithic structure, e.g. a monolithic polymeric or silica structure.

In embodiments according to the present invention, the channel may comprise a microchannel having an interior surface for containing the fluid while being propelled from the inlet to the outlet by the pump assembly 4.

A device according to embodiments of the present invention may also comprise a plurality of such channels, e.g. each channel forming a separation column. Each channel may have an inlet and an outlet disposed at respective ends of the channel. The device may comprise a header for driving a sample liquid through each channel. For example, the header may be connected to each inlet of the plurality of channels such as to drive the sample liquid through each channel. The outlet of each channel may be connected to the analysis device, e.g. may be adapted for delivering the liquid to the analysis device, e.g. for delivering the liquid to a mass spectrometer.

The analysis device 3 may for example comprise a mass spectrometer. The analysis device 3 may comprise a detector, such as an ultraviolet and/or visual spectrum photodiode array. The analysis device 3 may be adapted for providing a signal, e.g. an electrical or electronic signal, indicative of a plurality of amounts corresponding to the plurality of liquid components received from the separation column 2 via the outlet. A liquid chromatography device 1 according to embodiments of the present invention may comprise the analysis device 3.

The liquid chromatography device may further comprise a pump assembly 4 for generating a pressure gradient over the channel in an axial direction A from the inlet to the outlet. This pump assembly may for example comprise a pump arranged upstream of the channel, e.g. a pump having an outlet connected to the inlet of the channel. However, the pump assembly may also comprise a pump contained within the channel. The pump assembly may for example comprise an electro-osmotic pump.

The liquid chromatography device 1 may comprise other common features as known in the art, such as heating elements for controlling the temperature of the fluid in the channel, and/or a controller for controlling the pump assembly 4, the actuator 5 and/or other components of the liquid chromatography device 1. The device 1 may comprise a data storage device and/or a data processing device for storing and/or processing a signal provided by the analysis device 3.

In a third aspect, the present invention also relates to a method for separating a sample liquid in liquid chromatography. The method comprises the steps of generating a flow of the sample liquid through a channel in an axial direction, and separating the sample liquid into components by mass transfer interactions in the channel, e.g. using adsorbent elements arranged in or on the interior surface of the channel, for example using an array of pillar structures in the channel.

Generating the flow of the sample liquid through the channel in the axial direction may for example comprise applying a pressure gradient over the channel in the axial direction. Generating the flow of the sample liquid through the channel in the axial direction may for example comprise using an electro-osmotic pump.

The method further comprises inducing a flow in the sample liquid, when the sample liquid is flowing through the channel. This inducing of the flow comprises inducing a motion of the sample liquid in the channel in a plane substantially orthogonal to the axial direction. The induced flow may be a vortex flow.

Inducing the flow may comprise generating an electric field that induces this motion by acting on charged and/or polarizable constituents of the sample liquid. Furthermore, generating the electric field may comprise generating the electric field via a capacitive coupling of a plurality of electrodes over the sample fluid, in which the sample fluid is electrically insulated from the plurality of electrodes. Inducing the flow may comprise supplying an alternating voltage to the plurality of electrodes.

Supplying an alternating voltage to the plurality of electrodes may comprise supplying this alternating voltage having an AC frequency in the range of 50% to 200% of the characteristic time of the RC circuit formed by the electrodes and the sample liquid. For example, the frequency may be selected from a range of 75% to 150% of this characteristic RC-time. For example, the frequency may be selected from a range of 90% to 110% of this characteristic RC-time. For example, the AC frequency may be equal to about the RC-time of the electrode/solution system.

Further features of a method in accordance with embodiments of the present invention shall be clear from the description hereinabove relating to embodiments of the first and second aspect of the present invention. Particularly, the steps of generating the flow of the sample liquid through the channel in the axial direction and separating the sample liquid into components may be carried out using a pump assembly 4 and a channel 2 in accordance with embodiments of the first and/or second aspect of the present invention. Furthermore, the step of controllably inducing the flow may be carried out using a flow inducer 5 in accordance with embodiments of the first and/or second aspect of the present invention.

In a method or device according to embodiments of the present invention, an increased mass transfer rate between the support structures of chromatographic columns may be achieved, such that also a performance increase can be attained. This enhanced transport may be mediated by electro-osmotic flow, oriented perpendicular to the axial flow direction, e.g. an axial, pressure-mediated flow. For example, electrodes may be positioned underneath the stationary phase, enabling a versatile flow propulsion method.

Illustrative examples are provided herein below to demonstrate principles and advantages of embodiments according to the present invention. These examples are not intended to be limiting to the invention in any way, but merely provided to assist the skilled person in reducing embodiments of the present invention to practice.

In this example, an electrode having a thin $SiO_2$ layer was covered by a layer of mobile phase. It is observed that a saw-tooth voltage profile from 0 to 500 V with a period of 30 μs can induce a linear velocity of approximately u=100 μm/s under average HPLC mobile phase conditions. The tangential component of the electrical field near the electrode gives rise to a local EOF, in the absence of permanent charges.

It may be considered surprising that mixing or even vortex mixing can be effective in minimizing dispersion. For example, chaotic eddies are generated in mixers, thus creating turbulent flow, exactly to enhance dispersion and mixing. However, when these non-linear flows are oriented substantially perpendicular to the general flow direction, these dispersive effects can in fact be exploited to counter dispersion in the axial direction, which will eventually determine the analyte band width and concomitantly also the separation power.

The invention claimed is:

1. A chromatographic column assembly comprising:
    a channel comprising an inlet for receiving a sample liquid and an outlet, the channel being adapted for separating the sample liquid into components when said sample liquid flows through the channel in an axial direction from said inlet to said outlet; and
    a controllable flow inducer configured to electrically induce, when the sample fluid is flowing through the channel, a motion on charged and/or polarizable constituents of said sample liquid in the channel in a plane orthogonal to said axial direction, the electrically induced motion consisting of motion orthogonal to the axial direction.

2. The chromatographic column assembly according to claim 1, wherein said controllable flow inducer is a vortex flow inducer.

3. The chromatographic column assembly according to claim 1, wherein said controllable flow inducer comprises a plurality of electrodes arranged in or on said channel, the plurality of electrodes being adapted for generating an electric field suitable for inducing said motion.

4. The chromatographic column assembly according to claim 3, further comprising an electrical insulator for electrically insulating said plurality of electrodes from the sample liquid, when said sample liquid is contained in the channel, and wherein said electric field is generated by a capacitive coupling of said plurality of electrodes.

5. The chromatographic column assembly according to claim 3, further comprising a power supply for providing an electric potential difference over said plurality of electrodes.

6. The chromatographic column assembly according to claim 3, the chromatographic column comprising an electrical insulator for electrically insulating said plurality of electrodes from the sample liquid, when said sample liquid is obtained in the channel and wherein said electric field is generated by a capacitive coupling of said plurality of electrodes, the chromatographic column assembly comprising a power supply for providing an electric potential difference over said plurality of electrodes, wherein said power supply is adapted for generating an alternating electric potential difference over the plurality of electrodes.

7. The chromatographic column assembly according to claim 1, wherein said controllable flow inducer comprises a plurality of electrodes arranged in or on said channel, the plurality of electrodes inducing a motion by acting on the charged and/or polarizable constituents of said sample liquid, independent of the macroscopic flow of the sample liquid.

8. The chromatographic column assembly according to claim 1, wherein said channel comprises a plurality of adsorbent elements for mass transfer separation of said sample liquid when the sample liquid is flowing through the channel.

9. The chromatographic column assembly according to claim 8, wherein said plurality of adsorbent elements comprises an array of pillar structures.

10. The chromatographic column assembly according to claim 1, further comprising a pump assembly for generating a pressure gradient in the channel along said axial direction.

11. The chromatographic column assembly according to claim 10, wherein said pump assembly comprises a pump operationally coupled to said inlet such as to generate a pressure in the sample liquid at the inlet that is higher than a pressure in the sample liquid at the outlet.

12. The chromatographic column assembly according to claim 10, wherein said pump assembly is at least partially contained in said channel.

13. The chromatographic column assembly according to claim 10, wherein said pumping assembly comprises an electro-osmotic pump.

14. A liquid chromatography device comprising a chromatographic column assembly according to claim 1.

15. A liquid chromatography method for separating a sample liquid, the method comprising:
    generating a flow in an axial direction of the sample liquid through a channel;
    separating the sample liquid into a plurality of components by mass transfer interactions in the channel; and
    controllably electrically inducing a flow in the sample liquid, when the sample liquid is flowing through the channel,
    wherein said controllably electrically inducing of the flow comprises inducing a motion on charged and/or polarizable constituents of the sample liquid in the channel in a plane orthogonal to the axial direction, the electrically induced motion consisting of motion orthogonal to the axial direction.

16. The liquid chromatography method in accordance with claim 15, wherein controllably electrically inducing said flow comprises generating an electric field that induces said motion by acting on the charged and/or polarizable constituents of the sample liquid.

17. The liquid chromatography method in accordance with claim 16, wherein generating said electric field comprises generating said electric field via a capacitive coupling of a plurality of electrodes over the sample fluid, wherein the sample fluid is electrically insulated from the plurality of electrodes.

* * * * *